United States Patent Office 3,809,776
Patented May 7, 1974

3,809,776
ENZYMIC DEGRADATION OF NUCLEIC ACIDS
IN SCP MATERIALS
Kwei C. Chao, Homewood, Ill., assignor to
Standard Oil Company, Chicago, Ill.
No Drawing. Filed Feb. 22, 1971, Ser. No. 117,768
Int. Cl. C12c 11/00
U.S. Cl. 426—431                                    8 Claims

ABSTRACT OF THE DISCLOSURE

The nucleic acid content of single-cell protein (SCP) materials is reduced to a level acceptable in food products by physiological conditioning of unicellular microorganisms followed by degradation of nucleic acids by endogenous nucleases and leakage of degraded products into the surrounding medium. The treatment is accomplished under conditions of continuous sparging with oxygen, controlled temperature stages and buffered pH control. There is no substantial removal of protein material from the cells.

BACKGROUND OF THE INVENTION

Recent concern for the welfare of the world population has included consideration of additional means for feeding the rapidly increasing number of people involved. The problem embraces providing both adequate per capital caloric intake and a balanced diet, with particular reference to the acknowledged lack of sufficient protein-affording foods in many parts of the world. One means for providing necessary protein supplies is through the growth of single-cell protein-affording microorganisms, such as yeasts, bacteria and algae, for use as either foods or food supplements.

Production of single-cell protein (SCP) materials in large quantity may be accomplished by fermentation processes employing, for example, carbohydrate, hydrocarbon or oxygenated hydrocarbon materials as substrate. Principal requirements are that the substrate material be inexpensive and readily consumed by the selected microorganism so that process costs are not excessive. Equally important is the acceptability and utility of the SCP material as a food or food component. These latter considerations include taste and odor factors relating to public acceptance as well as metabolic and toxicity factors relating to suitability of SCP material for inclusion in the human diet.

Both the technical and the patent literature describe fermentation processes for production of microorganisms which readily afford useful SCP materials. For example, yeasts have been grown on the carbohydrates contained in waste sulfite liquor, the normal alkane components of a gas oil hydrocarbon fuel, and on a mixture of oxygenated hydrocarbons. Production of bacteria has been similarly described. Fermentation to produce yeasts or bacteria comprises an oxidation process, evolving much heat and requiring both substantial oxygen transfer and good control of fermentation temperature. Preferred substrate materials will already contain as much combined oxygen as possible in order to minimize the heat release and the oxygen requirement. Production of food-grade SCP material may also require an extraction step to limit the presence of undesirable, residual substrate material such as high-molecular-weight hydrocarbons or slowly fermented oxygenated hydrocarbon species.

A number of the fermentation processes planned or in use currently for production of SCP material are intended to provide primarily an animal feed supplement and hence to supply protein for human consumption only indirectly. However, some microorganisms, notably certain yeasts within the Saccharomycetoideae and Cryptococcoideae sub-families, have been approved by the Food and Drug Administration for direct use in foods intended for human consumption.

The human metabolic system produces uric acid as in the metabolism of ribonucleic acid (RNA). Since man does not have a uricase enzyme system, uric acid is not further broken down and is excreted with urine. Because uric acid has a very low solubility in water it will accumulate in the body in crystalline form if produced in larger quantities than the body can excrete. This may lead to the condition known as gout. It is, therefore, recommended by many nutritionists that the RNA intake in diet be kept at a low level.

Microbial cells, or single-cell protein (SCP) materials, contain from 4% to 30% or more nucleic acids according to their growth rates and the phase of growth. Usually the higher nucleic acid contents of the microbial cells are associated with rapid growth phases. If the microbial cells are to be used as a protein source in human feeding, nutritionists recommend generally that the amount of nucleic acids contributed by SCP to diet should not exceed 2 grams per day.

The calculated RNA contents of some conventional protein sources are given in Table I. These vary from 0 to 4 percent. The RNA content of SCP generally ranges from 8 to 18 percent for exponential growth phase cells. In SCP intended for human consumption the RNA content should preferably be reduced to about 2% on cell dry weight basis.

TABLE I

RNA content (calculated) of various protein sources

| Food: | Percent RNA |
|---|---|
| Milk | 0 |
| Beans | 1.7 |
| Salmon | 2.4 |
| Chicken | 2.9 |
| Beef | 3.7 |
| Pork | 4.1 |
| Liver | 9.3 |
| Anchovies | 14.5 |
| SCP | 8–18 |

A preferred way of utilizing SCP material is in the form of whole cells. Accordingly there is a need for the development of means for removing nucleic acids from within the microbial cells. This is desirably accomplished with a minimum loss of protein materials from within the cells in order to maintain the nutritional attractiveness of such SCP materials.

An approach to accomplishing the above goals is to take advantage of the enzyme systems already present within the unicellular microorganisms, activating the latent enzymes so that they act degradatively or hydrolytically in a selective manner upon the particular nucleic acid species present in the SCP material. One such process has been described in United States patent application Ser. No. 838,453, filed July 2, 1969, now abandoned wherein magnesium ion is withheld from the nutrient system during fermentation to enhance the activity of RNase and simultaneously deactivate RNA polymerase. Preferred conditions include heating the microbial culture to 45–100° C. under alkaline conditions, cooling, and then adding glucose as a leakage promoter in a final fermentation stage.

Another process has been described by Ohta, Maul, Sinskey and Tannenbaum in a paper presented at the 160th ACS National Meeting, Chicago, Illinois, September 1970, where a very dilute (less than 1 wt. percent cells) aqueous slurry of yeast cells is heated in a specific temperature cycle: very briefly (3–17 seconds) at 65–70° to shock the cells; then 1–2 hours at 45–50° C.; and finally about 1 hour at 55–60° C. The heat-shock step is claimed to be critical. The optimum pH range is from 5.0 to 6.5, in contrast to the alkaline conditions preferred in the first process above.

Both of the described processes reduce the nucleic acid content of cellular materials but are limited to operation on the relatively dilute fermentation broths. Enzymatic degradation conditions effective for use in treating concentrated cell creams, essentially free of the original fermentation broth with its various mineral salt nutrients, are necessary for development of economically attractive methods for affording new food materials from SCP having a desirable nutritional balance.

SUMMARY OF THE INVENTION

One object of this invention is to provide a novel and improved process for reducing the nucleic acid content of SCP materials to a level generally acceptable in food products intended for human consumption.

Another object is to provide new and useful food products and food ingredients comprising SCP materials having a suitably low nucleic acid content.

These objects are accomplished by a process of endocellular enzymatic degradation of nucleic acids and leakage of the resulting water-soluble fragments into the surrounding aqueous medium. The unicellular microorganisms are first physiologically conditioned at 30° C. under starvation conditions, and optionally cold-shocked at 0° C., to induce activation of the endogenous nucleases. This is followed by incubation at a controlled temperature of 50–55° C. and pH of 5.0–5.5 while the degradation proceeds, preferably in the presence of about 0.1 molar acetate ion. Aeration by sparging with an oxygen-affording gas is maintained throughout the treatment.

The resulting improved SCP food component has lost substantially none of its protein content and contains less than 2 wt. percent (dry basis) nucleic acids.

DESCRIPTION OF THE INVENTION

This invention relates to a novel method for reducing the nucleic acid content of unicellular microorganisms together with the novel and improved food products obtained thereby.

It has been found that most of the nucleic acid content of single-cell microorganisms can be removed by permitting the degradation of ribonucleic acid (RNA) by endogenous ribonucleases (RNase) under controlled conditions coupled with leakage of the soluble degraded products into the surrounding medium. This is accomplished with essentially no attack on the protein compositions contained within the cells. The effectiveness of the process is dependent upon close control of temperature and pH and is enhanced by employing either acetate or ethylenediamine tetraacetate ions, or both, in the medium as an extractant. It has thus been made possible, by application of this inventive process, to obtain single-cell protein material in the form of intact cells and having a nucleic acid content substantially below 2 wt. percent.

The efficiency of enzymic processes depends significantly upon the cultural history of the cells. The activity of endogenous NA-degradative enzymes is geared to the physiological status of the cells. When growth is limited by unfavorable physical or chemical environments, such as the condition existing at the phase of declining growth rate in the batch culture, cells are more susceptible to their own autolytic NA-degradative enzymes and a comparatively higher NA-reduction efficiency can be obtained. Faster growing cells with higher intracellular NA content are much more resistant to the NA-reduction treatment. A change of the physiological status of the cells by adjusting the cultural environment, such as by substrate starvation can activate the latent endogenous NA-degradative enzymes, such as ribosomal ribonucleases and thus improve the efficiency of the enzymic NA-degradation process. The invention disclosed herewith is directed to such a process whereby microbial cells are conditioned physiologically by changes in the cultural environment so that the endogenous nucleases are activated in an attractive manner.

The practice of this invention is broadly applicable to microorganisms and particularly to those organisms classified as bacteria, yeast and fungi. By way of illustration bacteria such as those listed in Table II, yeasts such as those listed in Table III and fungi such as those listed in Table IV are suitable microorganisms.

TABLE II.—Suitable bacteria

| | |
|---|---|
| Acetobacter sp. | Corynebacteria sp. |
| Arthrobacter sp. | Micrococcus sp. |
| Bacillus subtilis | Pseudomonas sp. |

TABLE III.—Suitable yeast

Candida curvata
Candida lipolytica
Candida pulcherima
Candida utilis
Hansenula anomala
Hansenula miso
Oidium lactis
Saccharomyces carlsbergensis
Saccharomyces fragilis
Trichosporon cutaneum
Saccharomyces cerevisiae
Candida parapsilosis
Hansenula wickerhamii
Pichia pastoris
Pichia haplophyla TABLE IV—Suitable fungi

| | |
|---|---|
| Aspergillus niger | Penicillium notatum |
| Aspergillus glaucus | Penicillium chrysogenum |
| Aspergillus oryzae | Penicillium glaucum |
| Aspergillus terreus | Penicillium griseofulvum |
| Aspergillus itaconicus | |

*Candida utilis, Saccharomyces cerevisiae, Saccharomyces fragilis,* and *Saccharomyces carlsbergensis* are preferred starting materials for the process of this invention, however, because each has been generally regarded by the F.D.A. as safe for use in food products.

Microbial cells suitable for the process of this invention may be grown aerobically in either a batch or continuous manner. Any suitable carbon-affording substrate may be employed although, for purposes of preparing SCP products for use in foods, an ethanol substrate is preferred. Any conventional combination of mineral nutrient elements may be employed. A convenient source of nitrogen is ammonia which may also be supplied to the fermentor as required to maintain the pH of the fermentation broth, preferably within the range from 3.5 to 5.5. Cells which have been grown at a rapid rate usually have a higher nucleic acid content while those grown more slowly tend to have a less permeable cell wall. Either of these types, as well as cells grown under oxygen-limiting or substratelimiting conditions may be usefully treated according to the present invention to afford improved and acceptable foods and food components suitable for human consumption.

Whether prepared by batch or continuous fermentation the effluent broth-cell mixture should be separated to provide a cell concentrate. This may be accomplished by, for example, filtration, decantation or centrifugation. The cells should preferably be washed with water and then concentrated (preferably centrifuged) to provide a cell cream containing from 5 to 15 wt. percent (dry basis) cells.

The cell cream, or slurry, is fed to a conditioning zone, or fermentor vessel, with agitation and maintained at approximately 30° C. while air, or other oxygen-affording gas stream such as an oxygen-nitrogen mixture, is introduced through any convenient sparging arrangement. The pH of the cell cream should be maintained at about 4.0. Preferably an aqueous ammonia solution, suitably 5% aqueous ammonia, is added to the cream as required to prevent the pH from dropping below 4.0. This environment subjects the cells to physiological conditioning by starving them of nutrient while providing continuous aeration. The shift of endogenous metabolism becomes apparent when the pH of the aerated cell cream starts to increase without any external addition of ammonia or other alkaline-reacting reagent, indicating the completion of the step.

The activity of the endocellular NA-degradative enzymes is then increased further by passing the conditioned cell cream, preferably through a heat-exchange coil, to an incubation zone, suitably a tank, where the cream is held at a temperature within the range from 50° to 55° C. for a time ranging from about 1 to about 3 hours. The pH of the cell cream continues to increase as it enters the incubation tank and should be permitted to rise to a value of at least 5.0 but not above about 5.5. The pH value is then maintained within the range from 5.0 to 5.5, preferably about 5.2, by addition of hydrochloric acid or acetic acid as required, while the cream remains in the incubation zone. Nucleic acid degradation under these incubation conditions is at a maximum and falls off rapidly at both higher and lower pH levels. Aeration is continued throughout the incubation period.

Use of acids other than hydrochloric or acetic for pH control should be approached cautiously. Some commonly available acids, such as phosphoric, inhibit the autolytic degradation. Acetic acid is generally to be preferred although hydrochloric acid is most often used because of its lower cost.

Control of pH is simplified by addition of a buffer reagent to the cell cream upon entry into the incubation zone. An acetate ion buffer solution of pH 5-5.5, preferably about 5.2 is effective at any molarity between 0.05 and 1.0, although it is preferred to use 0.05 to 0.25 M and most preferably about 0.10 M acetate ion. It has further been observed that a strikingly more efficient removal of water-soluble degradation products of nucleic acids (NA) from the cells to the aqueous phase is achieved when the acetate ion buffer is present. It has also been surprisingly found that ethylenediamine tetraacetate (EDTA) ion is similarly effective at low concentrations such as about 0.01 molar. The use of both acetate and EDTA ions, for example at 0.1 M and 0.01 M, respectively, is even more effective than either reagent employed alone.

Upon completion of a suitable incubation period, ranging from about 1 to about 3 hours, the heat-treated cells are separated from the aqueous supernatant phase by any conventional means, such as centrifugation, and washed with water. If desired, the aqueous supernatant phase may be charged, in whole or in part, to any primary fermentor to provide useful nutrient and substrate components for the growth of additional microbial single-cell organisms. The recovered cells still contain substantially all of their original protein material and may be dried to provide a suitable food product or food ingredient. The drying step may be accomplished by any conventional means, such as vacuum drying or spray drying, with care being taken not to heat the improved SCP product to excessively high temperatures. It is preferred to dry the SCP material at about 70° C.

Optionally, the water-washed, heat-treated cell may be extracted with warm aqueous sodium hydroxide solution, at a pH in the range from 7.0 to 8.0, at a temperature in the range from 60° to 70° C. to more completely remove solubilized NA degradation fragments. The cells are then finally separated, washed with water and dried.

The physiological condition of the SCP material can be enhanced if a cold-shock treatment is employed between the starvation period at about 30° C. and the incubation period at 50–55° C. It was surprisingly found that more extensive leakage of NA degradation fragments from within the cells occurred during incubation when the cells had first been chilled to about 0° C. and maintained at that low temperature for about 15 minutes.

The process of this invention reliably provides an improved SCP material containing less than 2 wt. percent (dry basis) nucleic acids. The protein content of the treated cells is usually within the range from 50 to about 60 wt. percent (dry basis) which corresponds substantially with the protein present in the original cells. Desirable physical properties, including taste and odor, are not harmed by the process of this invention and the resulting SCP food material has been substantially improved in its nutritional characteristics. Surprisingly, the functional properties; i.e., texturizing characteristics, water and oil retention, low dispersibility in water, and the like, are greatly improved. Accordingly, the SCP food materials of this invention possess great versatility relative to incorporation in conventional food products and to development of new food products.

SPECIFIC EMBODIMENTS OF THE INVENTION

The following examples are illustrative, without implied limitation, of my invention.

EXAMPLE I

Cells of *Candida utilis* (ATCC 9256) were grown in a continuous fermentor in a mineral salts medium containing ethanol as the carbon-containing substrate material. The space velocity was maintained at 0.22 hr.$^{-1}$ with growth limited by the ethanol concentration rather than by the aeration rate. Harvested cells were recovered from the effluent (containing 3.6 wt. percent cells) by centrifuging and washing to provide a paste containing about 22 wt. percent solids. Four kilograms of the paste was then resuspended in 4 liters of deionized water to provide 8 liters of a slurry containing 10 wt. percent (dry basis) cells. The aqueous cell slurry was then heated to $53\pm1°$ C. with continuous agitation (800 r.p.m.) and aeration (1 vol. air/vol. suspension/minute). The slurry was maintained under these conditions for 3 hours while holding the pH of the slurry at $5.2\pm0.1$ by addition of 6 N hydrochloric acid as required. The cell slurry was then centrifuged and the cell cream washed with water. The cell cream was reslurried in hot water at 65° C. to provide a 15 wt. percent slurry, made alkaline by addition of sodium hydroxide to pH 7.5, centrifuged, washed with water and finally dried. Whereas the original harvested cells contained 10 wt. percent (dry basis) nucleic acids, the treated cells contained only 3.3 wt. percent. The yield of recovered cells was 77.5% and the protein content of the treated cells was 58.0 wt. percent. The treated cells also contained very little phosphorus and ash. The original yeasty flavor had been eliminated and functional properties had been improved.

EXAMPLE II

The procedure of Example I was repeated except for the use of glacial acetic acid rather than 6 N hydrochloric acid for control of pH during the heating period at 55° C. The nucleic acid content of the treated cells was 2 wt. percent (dry basis). The yield of recovered cell material was 78.0% and the protein content of the treated cells was 60.0 wt. percent.

EXAMPLE III

The procedure of Example II was repeated except for the use of spent fermentation liquor rather than fresh water when preparing cell slurries. The nucleic acid content of the treated cells was 3.6 wt. percent (dry basis).

EXAMPLE IV

*Candida utilis* (ATCC 9256) cells were grown as a continuous culture at a space velocity of 0.38 hr.$^{-1}$ in a mineral salts medium employing ethanol as a carbon-supplying substrate with growth rate limited by the concentration of dissolved oxygen. The harvested cells were treated according to the procedure of Example II. The originally harvested cells contained 12.0 wt. percent (dry basis) nucleic acids and the treated cells 4.6 wt. percent nucleic acids.

EXAMPLE V

The procedure of Example IV was repeated except that, prior to heating to 55° C., the cell slurry was agitated and aerated at about 30° C. while holding the pH at a value no lower than 4.0 by the addition of 5% aqueous ammonium hydroxide as required. This conditioning, or starvation, treatment was continued for 30 minutes when it was observed that the pH value was increasing without addition of ammonium hydroxide. Following further processing as in Example II, the treated cells contained only 1.8 wt. percent (dry basis) nucleic acids.

EXAMPLE VI

A 5 wt. percent (dry basis) aqueous slurry of Torula yeast cells was subjected to the treatment procedure of Example I, except for being maintained at 55° C. for 5 hours, while periodic samples of the aqueous phase were taken for measurement of solubilized nucleotidic material. Such materials exhibit an absorption maximum at a wave length near 260 m$\mu$. A second slurry was processed in the same manner after being chilled to 0° C. and maintained at that temperature for 15 minutes prior to heating to 55° C. Spectrophotometer measurements showed an improved solubilization of nucleotidic material when the cells were first subjected to the cold-shock treatment.

| Time at 55° C. | Soluble nucleotide material, $A_{260}$ | |
|---|---|---|
| | Cold shock | No cold shock |
| 1 hour | 33 | 10 |
| 3 hours | 43 | 18 |
| 5 hours | 51 | 26 |

EXAMPLE VII

The procedure of Example VI was repeated with the addition of (a) acetate ion buffer solution to provide a 0.1 molarity while maintaining the pH at 5.2, (b) ethylene diamine tetraacetic acid (EDTA) to provide 0.01 molarity, or (c) both, when the slurry was brought to 55° C. After 2 hours at 55° C. the optical density, or absorbance at 260 m$\mu$ ($A_{260}$), of the aqueous phase was measured as an indication of the extent of solubilization of nucleotidic materials. Both acetate and ethylenediamine tetraacetate ions were effective for removing nucleic acid material from the cells and when used in combination were even more effective.

Additive: $A_{260}$
None _____ 32
0.1 M acetate _____ 83
0.01 M EDTA _____ 68
0.1 M acetate+0.01 M EDTA _____ 97

EXAMPLE VIII

Torula yeast cells were grown at 30° C. and pH 4.0 in a batch fermentor employing a mineral salts nutrient solution and ethanol as the carbon-supplying substrate material. The fresh cell slurry was then fed continuously to a fermentor vessel at a space velocity of 0.3 hr.$^{-1}$, maintaining the same temperature and pH conditions as in the batch production run, while aerating with air to maintain a dissolved oxygen concentration no lower than 85% saturation. No acetate ion was present. The treated cell slurry was continuously harvested and the cells separated from the aqueous phase. In periodic analyses the $A_{260}$ reading for the supernatant aqueous phase was 319±9. The nucleic acid content of the treated and dried cells was 3.2±0.3 wt. percent. Cell recovery was 77.0±3.0 wt. percent.

I claim:
1. A process for substantially reducing the nucleic acid content of single-cell protein material, intended for use in food products and derived from unicellular microorganisms grown in a fermentor aerobically in a suitable fermentation broth, comprising the steps of:
 (a) separating the cells from a major portion of the fermentation broth to provide a concentrated cell slurry;
 (b) washing the slurried cell concentrate with water;
 (c) centrifuging the washed cell concentrate to provide a cell cream comprising 5 to 15 wt. percent cells;
 (d) sparging into the cell cream an oxygen-affording gas stream while maintaining the cell cream at a temperature of about 30° C.;
 (e) controlling the acidity of the sparged cell cream at about pH 4.0 by the addition of 5% aqueous ammonia as required;
 (f) maintaining the sparged cell cream at about 30° C. until the pH value starts to rise without further addition of aqueous ammonia;
 (g) heating the cell cream with continued sparging to a temperature within the range from 50° to 55° C.;
 (h) buffering the heated and sparged cell cream by adding aqueous acetate ion buffer solution in sufficient amount to provide a molarity in the range from 0.05 to 1.0;
 (i) thereafter maintaining the buffered cell cream temperature at 50° to 55° C. for a treating period of 1 to 3 hours with continuous sparging while maintaining the acidity within the pH range from 5.0 to 5.5 by the addition of hydrochloric acid or acetic acid as required;
 (j) centrifuging the treated cell cream to provide a supernatant aqueous phase and a heat-treated cell concentrate, having a substantially reduced nucleic acid content;
 (k) washing the heat-treated cell concentrate with water; and
 (l) drying the washed heat-treated cell concentrate.
2. The process of claim 1 wherein at least a portion of the supernatant aqueous phase is added to the fermentation broth in the fermentor.
3. The process of claim 1 wherein the cell cream comprises about 10 wt. percent cells.
4. The process of claim 1 wherein the heated and sparged cell cream is buffered to a pH value within the range from 5.0 to 5.5 by adding acetate ion buffer solution to provide an acetate ion molarity in the range from 0.05 to 0.25.
5. The process of claim 1 wherein the sparged cell cream is chilled to about 0° C. and maintained thereat for about 15 minutes prior to heating to a temperature within the range from 50° to 55° C.
6. The process of claim 1 wherein the unicellular microorganism is a bacteria or yeast.
7. The process of claim 6 wherein the microorganism is a yeast selected from the class consisting of *Saccha-* romyces cerevisiae, Saccharomyces carlsbergensis, Saccharomyces fragilis and Candida utilis.

8. The process of claim 7 wherein the yeast is Candida utilis.

References Cited

UNITED STATES PATENTS

| 3,243,354 | 3/1966 | Nakao et al. | 195—28 N |
| 3,163,638 | 12/1964 | Miwa et al. | 195—28 N |
| 3,615,654 | 10/1971 | Ayukawa et al. | 99—14 |
| 3,634,194 | 1/1972 | Frankenfeld | 195—28 N |
| 3,139,385 | 6/1964 | Ogata et al. | 195—28 N |

OTHER REFERENCES

Ogata et al., Agr. Biol. Chem., Vol. 26, No. 9, pp. 596–610 (1962).

ALVIN E. TANENHOLTZ, Primary Examiner

U.S. Cl. X.R.

195—2, 28 N; 426—60, 204

UNITED STATES PATENT OFFICE
CERTIFICATE OF CORRECTION

Patent No. 3,809,776          Dated May 7, 1974

Inventor(s) Kwei C. Chao

It is certified that error appears in the above-identified patent and that said Letters Patent are hereby corrected as shown below:

Column 6, line 14, "condition" should be -- conditioning --.

Signed and sealed this 1st day of October 1974.

(SEAL)
Attest:

McCOY M. GIBSON JR.
Attesting Officer

C. MARSHALL DANN
Commissioner of Patents